(12) United States Patent
McCarthy

(10) Patent No.: US 7,608,780 B2
(45) Date of Patent: Oct. 27, 2009

(54) BACK PLATE FOR NETWORK CONNECTION BOX

(75) Inventor: Craig McCarthy, Denton, MD (US)

(73) Assignee: Holocom, Inc., San Diego, CA (US)

( * ) Notice: Subject to any disclaimer, the term of this patent is extended or adjusted under 35 U.S.C. 154(b) by 0 days.

(21) Appl. No.: 12/370,011

(22) Filed: Feb. 12, 2009

(65) Prior Publication Data
US 2009/0205864 A1 Aug. 20, 2009

Related U.S. Application Data

(60) Provisional application No. 61/030,067, filed on Feb. 20, 2008.

(51) Int. Cl.
*H02G 3/14* (2006.01)
(52) U.S. Cl. .............. 174/50; 174/58; 174/60; 174/135; 174/53; 174/64; 439/535; 249/906
(58) Field of Classification Search ............ 174/50, 174/58, 60, 135, 53, 57, 63, 64; 439/535; 220/4.02; 248/906
See application file for complete search history.

(56) References Cited

U.S. PATENT DOCUMENTS

| | | | |
|---|---|---|---|
| D286,768 S | 11/1986 | Borsh et al. | |
| D459,312 S | 6/2002 | Roesch et al. | |
| D462,664 S | 9/2002 | Roesch et al. | |
| 6,617,511 B2 * | 9/2003 | Schultz et al. | 174/53 |
| 6,838,616 B2 | 1/2005 | Harrison et al. | |
| 7,034,222 B1 * | 4/2006 | York | 174/50 |
| 7,049,517 B2 * | 5/2006 | McCarthy et al. | 174/68.3 |
| 7,115,814 B2 * | 10/2006 | McCarthy et al. | 174/68.3 |
| 7,183,488 B2 * | 2/2007 | McCarthy et al. | 174/68.3 |
| D556,694 S | 12/2007 | Sipe | |
| D567,769 S | 4/2008 | Sinai | |
| D580,871 S | 11/2008 | McCarthy | |

OTHER PUBLICATIONS

U.S. Appl. No. 29/305,071, filed Mar. 13, 2008, inventor McCarthy (not yet published).

* cited by examiner

*Primary Examiner*—Dhiru R Patel
(74) *Attorney, Agent, or Firm*—Procopio, Cory, Hargreaves & Savitch, LLP

(57) ABSTRACT

A back plate device is formed by a generally rectangular frame having an open front face a back plate which is recessed inwardly from the open front face, and at least one wall extending forward from the back plate to the open front face, the wall extending around at least part of the frame periphery. The back plate has a cable access opening and a ledge surrounding the opening against which a face plate can be seated. The outer dimensions of the frame are less than the inner dimensions of a network connection box in which it is to be mounted, and the back plate is spaced from a rear wall of the box when installed to define a concealed cable management area behind the frame.

38 Claims, 15 Drawing Sheets

BACK PLATE FOR NETWORK CONNECTION BOX

RELATED APPLICATIONS

The present application claims the benefit of U.S. provisional patent application No. 61/030,067 filed Feb. 20, 2008, which is incorporated herein by reference in its entirety.

BACKGROUND

1. Field of the Invention

The present invention relates to a back plate device or face plate connector insert for a network connection box or enclosure in a network system which permits access for an authorized user to connect to the system.

2. Related Art

In many industries, there is a need for routing of signaling and transmission lines such as computer, power, communication and similar cables or wires. In some cases, access to such lines must be prevented or at least deterred. Secure conduit systems for this purpose are known and generally include one or more locked enclosures or control boxes to permit access and plug in to the system by authorized personnel, together with a secure conduit system which encloses the lines and extends between the control boxes and other similar devices. Such a secure conduit system is described, for example, in U.S. Pat. Nos. 7,049,517, 7,053,303, 7,115,814, and 7,183,488 of McCarthy et al.

The secure conduit system described in the above identified patents has lengths of communication lines or cable with ends which connect to locked enclosures, control boxes, or through wall penetrations. Other secure network systems are known with other provisions for deterring access to conduits carrying cables or other lines through the system, and such systems also have locked control boxes or enclosures positioned at appropriate locations throughout the system to allow access by authorized users. A connection device within the enclosure or control box has suitable sockets or ports to allow authorized users to plug in their electronic appliances, such as computers, to the central communication, computer, or other electronic system linked to the secure conduit or cable system. Where multiple cables are connected to the control box, cable management can be a problem

SUMMARY

Embodiments described herein provide for a back plate device or face plate connector insert designed for mounting in a locked enclosure or user control box of a conduit or network system, and having a recessed mounting face or back plate for mounting a standard face plate to which authorized users having access to the box can connect or plug in cables connected to authorized appliances such as computers, communication devices, and the like.

According to one embodiment, a back plate device for mounting in a user control box is provided which comprises a generally rectangular frame having an open front face, a back plate which is recessed inwardly from the open front, a wall extending from the back plate to the open front face, and at least one outwardly directed peripheral flange or rim extending around at least part of the open front of the frame, the back plate having a cable opening and a ledge surrounding the opening against which a face plate can be seated. The frame has outer dimensions less than the inner dimensions of a network connection box in which it is to be secured, so that the back plate is spaced from the rear wall of the box when installed to define a concealed cable management area behind the back plate. A cable access opening may be positioned in an outer wall of the box so as to direct cable into the cable management area.

In one embodiment, the ledge has fastener openings aligned with corresponding fastener openings in a face plate seated on the ledge and extending over the aperture, and at least two cable management tabs or fingers project outwardly from the rear face of the back plate into the cable management area. The fingers form a spool for winding excess lengths of cable connected to the face plate. The peripheral rim of the frame is designed to seat against corresponding shoulders or rims in a network connection box or enclosure.

In one embodiment, a first back plate device is designed for mounting in a user drop box having a drop down door, and has upper and lower wall portions and two side wall portions. The peripheral flange may be a continuous flange which extends from the edge of the upper wall portion and both side wall portions for seating against ledges or rims adjacent a front opening of a user control box, while the lower wall portion has no peripheral rim. Alternatively, separate peripheral rims or flanges may extend along part of the edge of the upper wall portion and side wall portions. Sufficient clearance is provided between the lower wall portion and the adjacent rim of the box opening to allow for pivoting of the edge of the door between the open and closed positions.

In another embodiment, a back plate device is designed for mounting in a user control box having a side opening door. In this case, the back plate device has upper and lower wall portions and one side wall portion, with no side wall on the side adjacent the door. Peripheral rims or flanges extend from the upper and lower wall portions to engage over corresponding ledges or shoulders inside the control box. The base, aperture, and spool fingers may be identical or substantially identical to those of the first back plate device.

In yet another embodiment, the recessed back plate of the back plate device may be inclined at an angle to the front opening, and the device may have opposite side wall portions with peripheral flanges extending along at least part of the front edge of each side wall, as well as an upper rim or ledge adjacent an upper edge of the back plate. This alternative provides a back plate device which can fit into a smaller enclosure, with the inclined back plate providing a space behind the device for receiving and handling cables to be connected to a face plate mounted on the front side of the back plate. An inclined back plate can also be helpful for strain relief, so that the cables do not have to bend through 90 degrees when entering the box and connecting to a face plate. Where a cable entry opening is in an upper wall of the box, the back plate may be inclined rearwardly from the top to the bottom of the cable management area, so that it faces the upper wall. Similarly, if the cable entry opening is in the lower wall, the back plate is inclined rearwardly in a direction towards the upper wall of the box. The cable entry opening may also be in a side wall, in which case the back plate is inclined rearwardly in a direction towards the opposite side wall. This arrangement can reduce stress and provide strain relief for cable connections, which may be useful for fiber optic connections which are more susceptible to stress.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a back plate device or face plate connector insert designed for mounting in a locked enclosure or user control box of a secure conduit or network system, the device having a recessed mounting face or back plate for mounting an electrical connector face plate to which authorized users having access to the box can connect authorized appliances such as computers, communication devices, and the like.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 5:
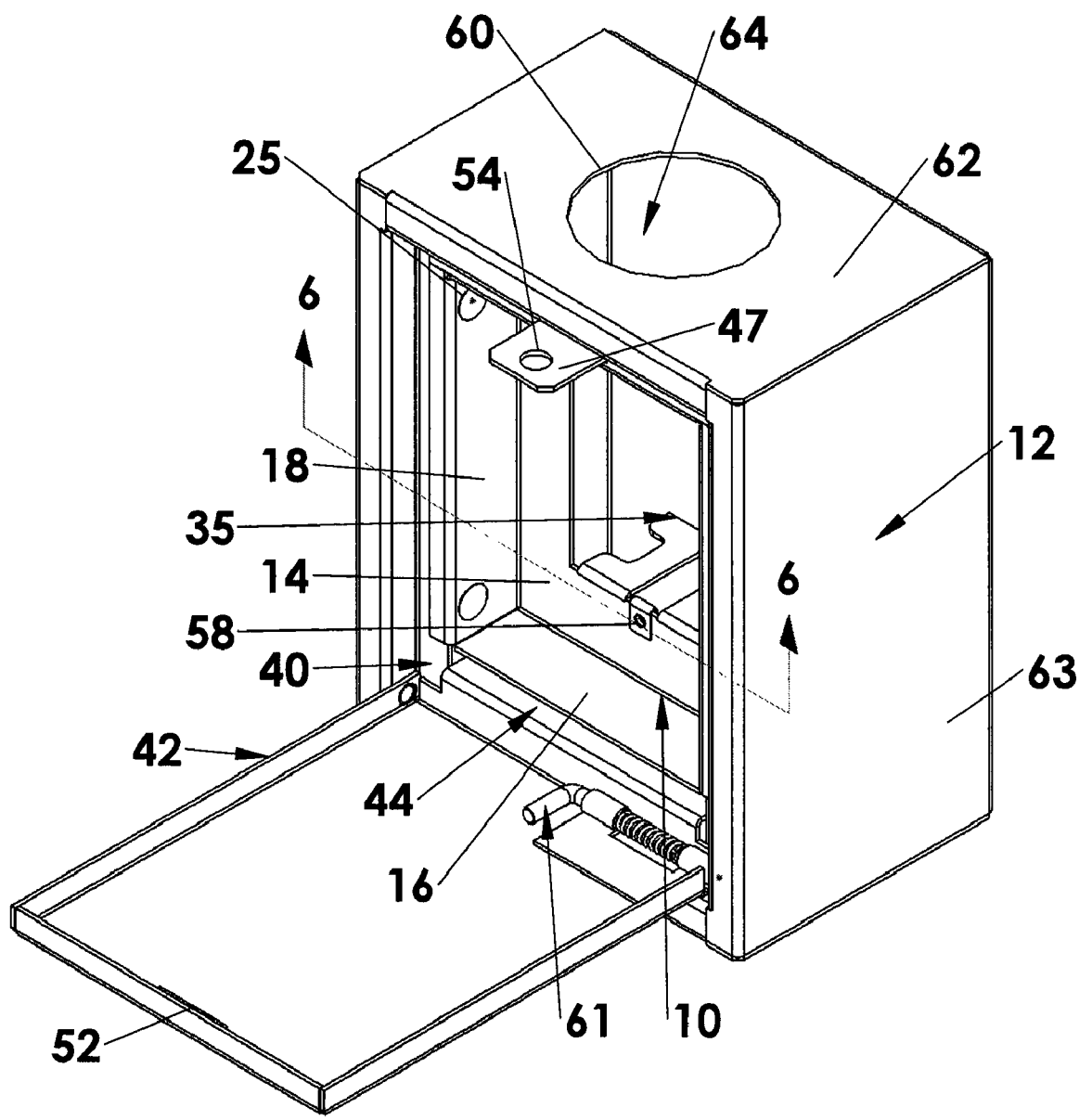
FIG. 5 is a perspective view of a user drop box or network connection box with the back plate device of FIGS. 1 to 4 secured inside the drop box.
Figure 6:
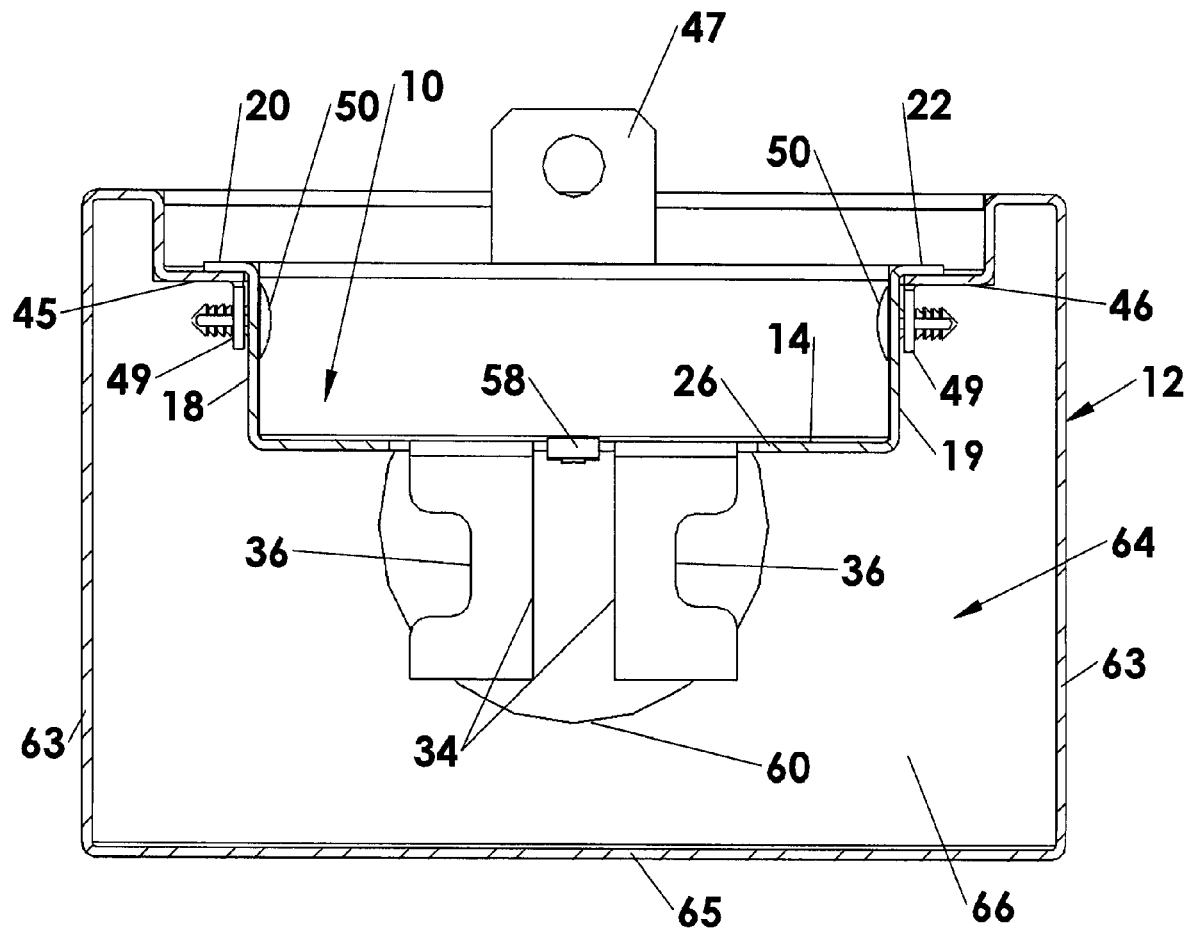
FIG. 6 is a cross-sectional view on the lines 6-6 of FIG. 5.
Figure 7:
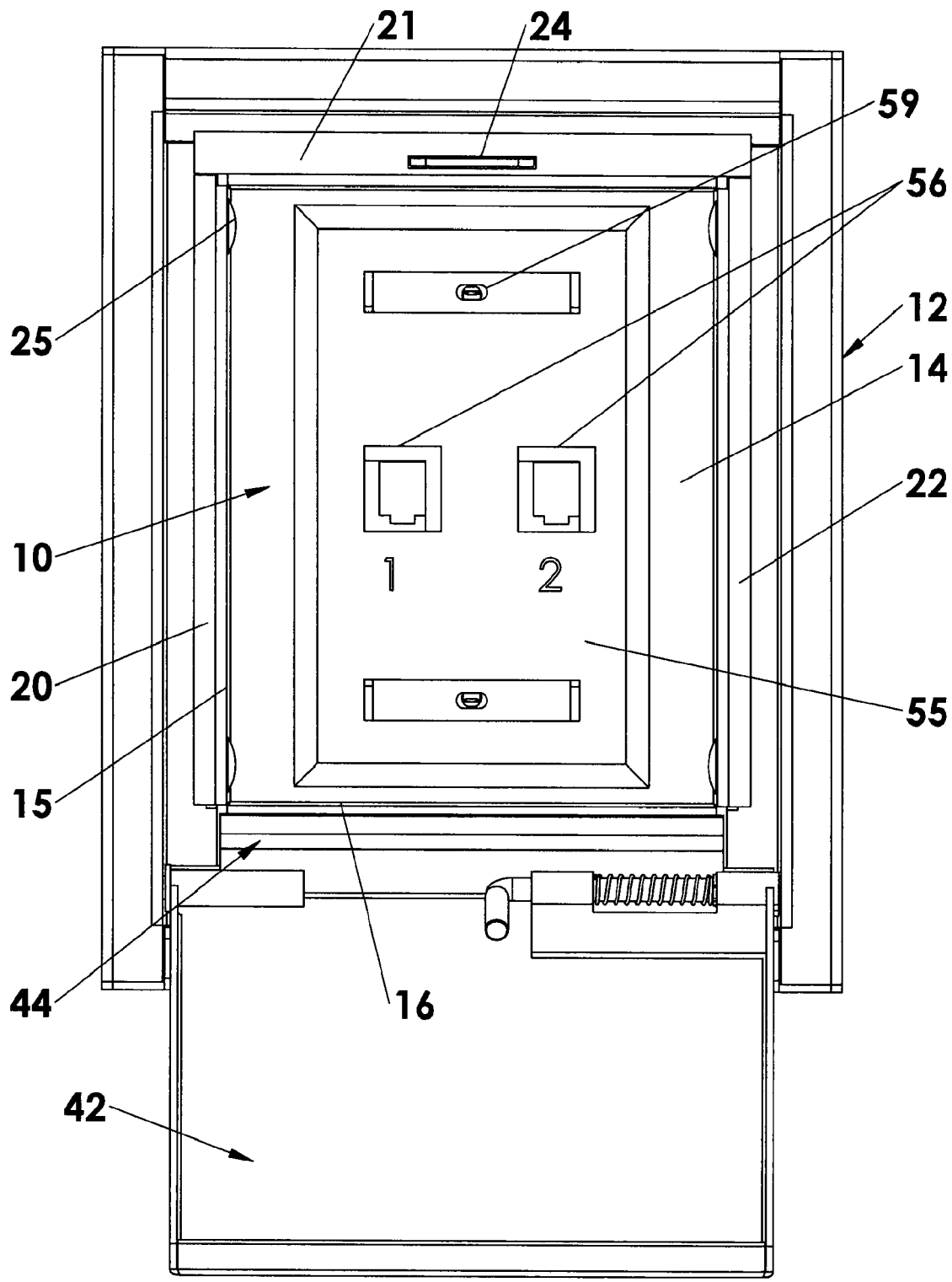
FIG. 7 is a front elevation view of the user drop box and back plate device of FIG. 5, with a face plate seated on the recessed back plate of the back plate device.

FIGS. 1 to 4 illustrate a first embodiment of a back plate device or face plate connector insert 10 which may be mounted in a user drop box or network connection box 12 of a secure network, as illustrated in FIGS. 5 to 7. The back plate device 10 is a generally rectangular frame designed for mounting in a connection box 12 having a drop down door, such as the user drop box sold by Holocom, Inc. of Carlsbad, Calif. under the product code SEC-WM-UDB-H1, or other connection boxes with drop down doors. The back plate device 10 is designed for management of cables entering the box 12 through an opening in any wall of the box, in this case opening 60 in a top wall of the box, and for mounting of a face plate or connector plate to which the cables can be terminated. As is known in the field, such face plates provide plug-in jacks or ports to which an authorized user can connect their appliances, such as computers, communication devices, and the like. In one embodiment, the secure network may be as described in U.S. Pat. No. 7,115,814 of McCarthy et al., the contents of which are incorporated herein by reference, but the device 10 may be used in connection boxes of other secure and non-secure networks in other embodiments, with appropriate adjustment of its dimensions to fit the box in the manner illustrated. The secure conduit or network system includes one or more sections of elongate channel elements or conduit sections securely coupled together to form a conduit system extending over a predetermined pathway which may include bends and branches as needed, and which connects to a series of user control boxes or connection boxes at desired locations. Cables extend through the conduit system to connect various network components and appliances together and to provide plug in points for authorized users at the various user control boxes. The back plate device 10 is designed to be readily mounted in such boxes which have drop down doors and to provide a convenient mounting surface for any industry standard face plate, as described in more detail below.

Figure 1:
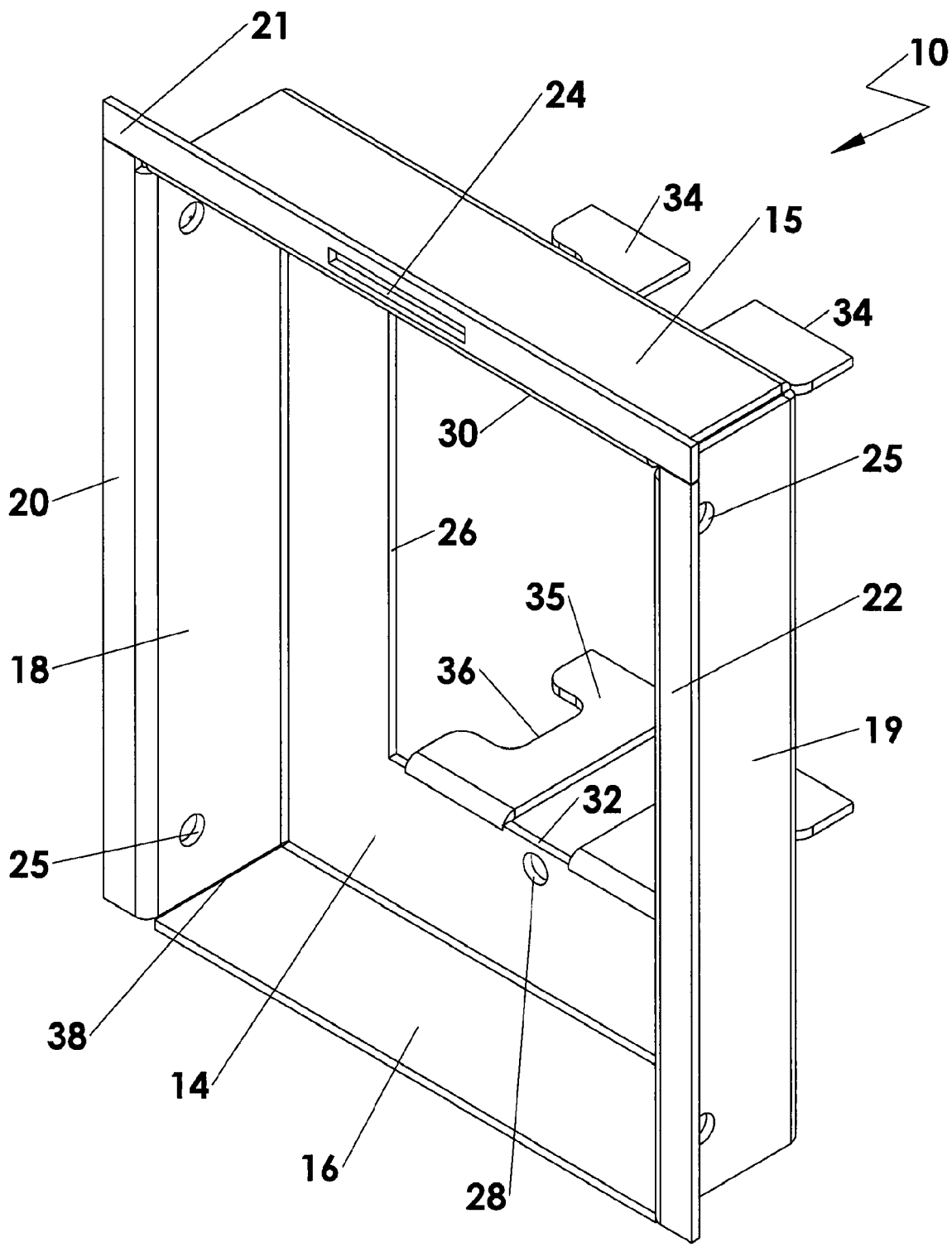
FIG. 1 is a front perspective view of a first embodiment of a back plate device.
Figure 2:
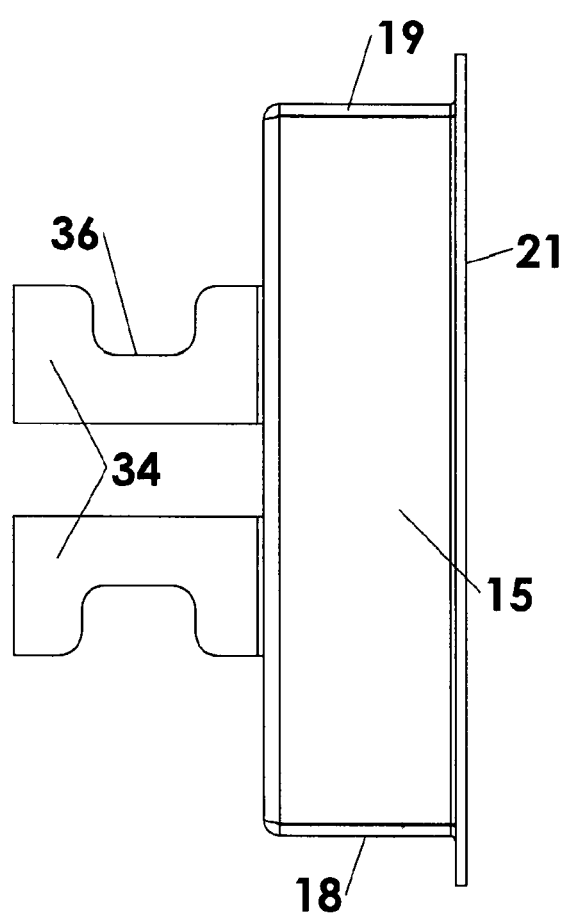
FIG. 2 is a top plan view of the device of FIG. 1.
Figure 3:
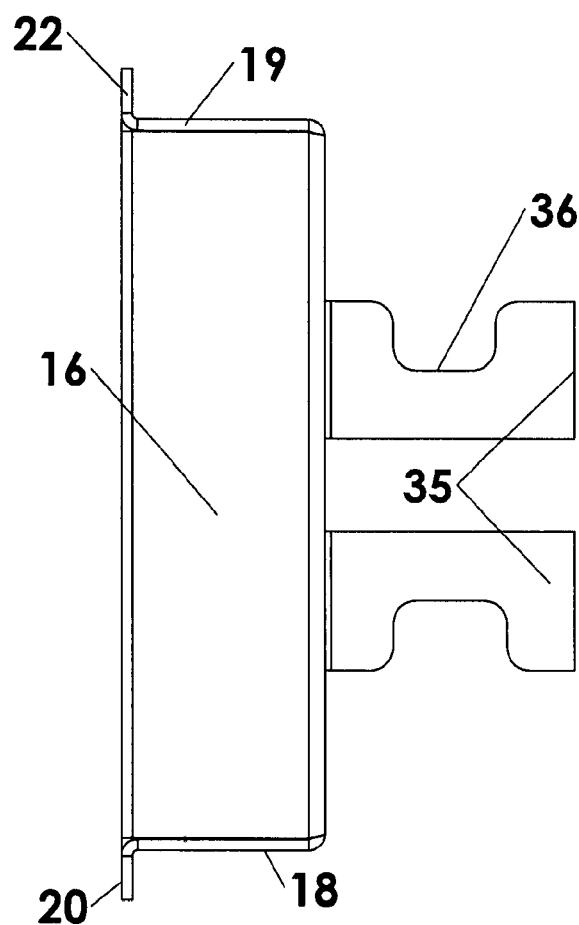
FIG. 3 is a bottom plan view of the device of FIG. 1.
Figure 4:
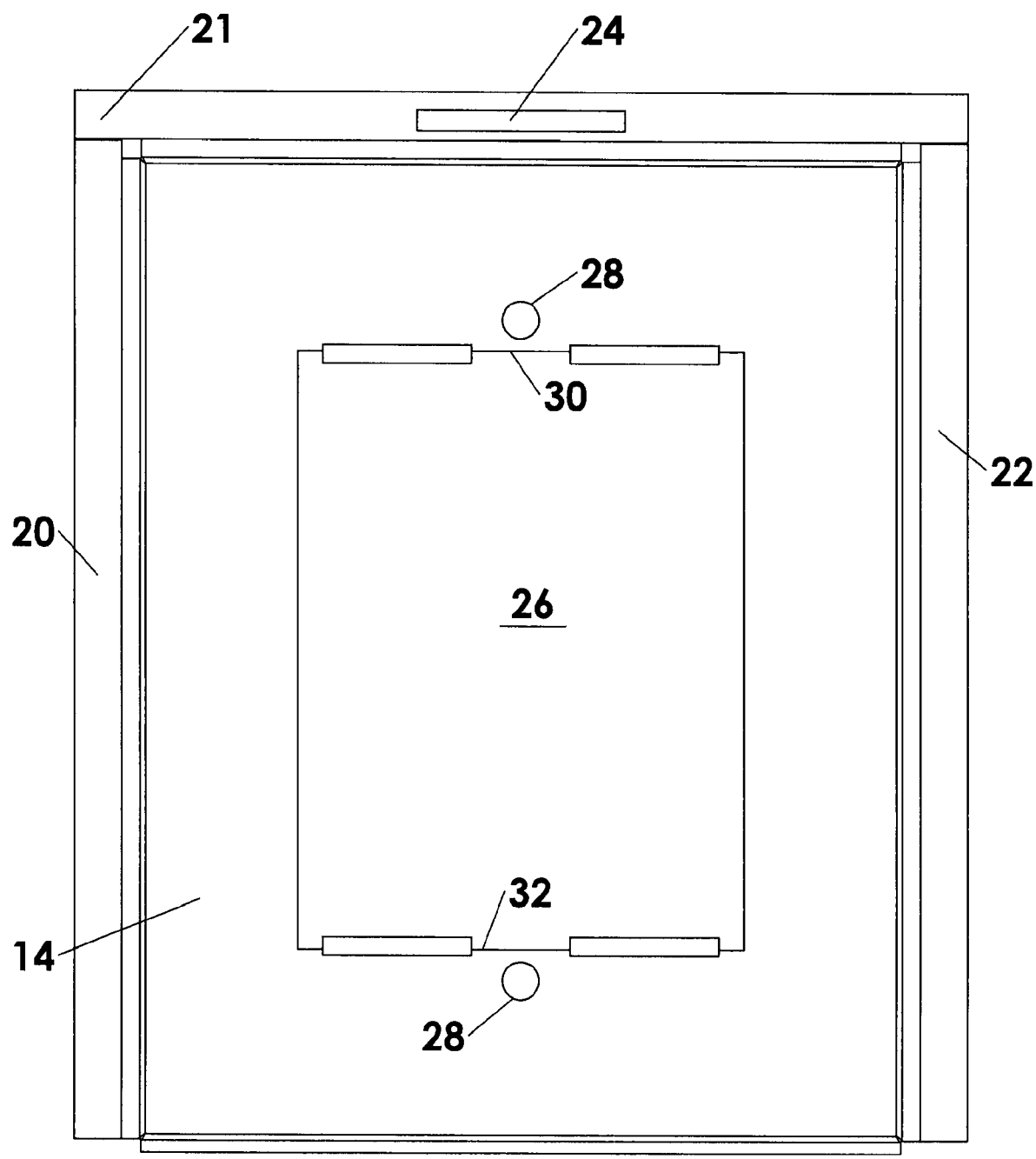
FIG. 4 is a front elevation view of the device of FIGS. 1 to 3.

As best illustrated in FIGS. 1 to 3, the back plate device 10 is a frame of a generally rectangular or box-like shape, having four perpendicular sides, an open front face and a generally flat, recessed inner wall or back plate 14. In this embodiment, each of the sides of the frame comprises a wall portion 15, 16, 18, 19 extending between the back plate and open front face of the frame, but in other embodiments one or more of the sides of the frame between the back plate and open front face may be open. In the orientation of the back plate device 10 shown in the drawings, wall portion 15 is at an upper end of the back plate device and wall portion 16 is at a lower end of the back plate device, and the terms "upper" and "lower" are used in connection with these wall portions in the remainder of the description, while opposite wall portions 18, 19 are referred to as side wall portions. The terms "upper," "lower," and "side" in connection with this embodiment and the other embodiments described below are used for convenience only relative to the orientation shown in the drawings, and should not be interpreted as limiting the device 10 to usage only in the indicated orientation.

Outwardly projecting flat rim portions or flanges 20, 21, and 22 extend along the outer edges of the side wall portion 18, upper wall portion 15, and side wall portion 19, while the lower wall portion 16 has no rim. The upper rim portion or flange 21 has a central, elongate slot 24. A pair of fastener openings 25 is provided in each side wall portion 18, 19. The dimensions of the flanges may be varied depending on the rims or edges against which the insert is to be seated in the box.

The recessed inner wall or back plate 14 is of predetermined dimensions for seating any standard electrical connector face plate, and has a generally rectangular aperture or cable access opening 26 for cables to be connected to jacks or junctions provided on the face plate or connector. Fastener openings 28 are located adjacent the center of the upper and lower edges 30, 32 of the aperture for receiving suitable fasteners for securing the face plate to the back plate 14. A first pair of upper cable management fingers or tabs 34 project from the rear face of back plate 14 adjacent opposite ends of the upper edge 30. A second pair of lower cable management fingers or tabs 35 which are of identical shape and dimensions to fingers 34 project from the rear face of back wall 14 adjacent opposite ends of the lower edge 32 of the aperture.

Each finger 34, 35 has a generally rectangular indent 36 with rounded corners on its outer edge, which faces away from the indent 36 in the opposite edge, and each upper finger 34 is aligned with a respective lower finger. The indents 36 may alternatively be semi-circular or of any other generally arcuate or rectangular indented shape suitable for seating cable windings. The four cable management fingers 34 together define a spool-like winding frame for cable entering a user control box, as described in more detail below. Less than four fingers or tabs may be provided in other embodiments.

In one embodiment, the back plate device 10 is formed integrally from one rectangular piece of high strength metal which is cut diagonally at the corners and bent to form the upper, lower, and side wall portions 15, 16, 18 and 19 and flanges or rims 20, 21, 22, with each cut corner 38 between a respective adjacent pair of peripheral walls. The cable management fingers 34, 35 can also be formed or stamped in the piece of metal originally forming part of aperture 26, with a single stamping operation forming the aperture and fingers, and the fingers can then be bent outwardly perpendicular to the rear face of back plate 14, as illustrated in FIGS. 1, 2 and 3. Alternatively, the parts or walls forming the back plate device 10 may be formed separately and secured together by welding or the like.

The dimensions of the back plate device 10 are selected so that the recessed back plate 14 or mounting face is of larger dimensions than a standard electrical connector face plate, and so that the device fills or covers a door opening in a network connection box or control box 12, as illustrated in FIGS. 5 to 7. Typically, box 12 has a recessed rim or shoulder 40 around the door opening, and the outwardly projecting rim portions or flanges 20, 21, and 22 are designed to be seated against rim 40 while the remainder of the back plate device extends into the box. In this embodiment, the back plate device is designed to fit in a control box 12 which has a door 42 pivoted at its lower edge to the lower rim of the door opening, such as the user drop box manufactured by Holocom, Inc. as referenced above, or other user connection boxes with drop down doors. In this embodiment, door 42 is pivoted to the lower edge of the door opening via pivot mechanism 61, and the lower wall 16 of the insert 10 has no peripheral rim and is spaced above the lower rim of the door opening to allow a sufficient clearance 44 for the pivot mechanism as the door pivots between the open and closed positions. In one embodiment, the dimensions of the back plate 14 were around 3.75 inches by 4.75 inches, the dimensions of aperture 26 were around 2.25 by 2.9 inches, the height of each of the peripheral walls 15, 16, 18, and 19 was around one inch, and the width of each rim 20, 21, 22 was around 0.25 inches. Back plate devices of different dimensions may be provided for mounting in different size user control boxes or secure enclosures, and for seating different size face plates such as double face plates having more than two connection jacks or plug sockets.

Network connection box 12 comprises a housing having an upper or first end wall 62, a lower or second end wall 66, opposite side walls 63, a rear or back wall 65 and a front wall in which the door opening is located. Although the terms "upper" and "lower" refer to the box in a vertical orientation, these terms are used for convenience only and the box may be mounted on any surface in any suitable or convenient orientation when installed together with a network conduit system. On installation, device 10 is positioned in the box with the side rims or flanges 20, 22 seated against the corresponding sides 45, 46 of the front rim of the door opening, the slot 24 in the upper rim or flange 21 engaging over a projecting lock tab 47 in the upper portion 48 of the front rim, and the upper rim 21 seated against the upper portion of rim 40, as indicated in FIGS. 5, 6 and 7. The dimensions of the frame or device 10 are less than the dimensions of the box interior, so that when installed the back plate 14 is spaced from the rear wall of the box to define a cable management area 64 behind the device 10. When the device or frame 10 is seated in the box in the position shown in FIGS. 5 to 7, the fastener openings 25 in the side wall portions 18 and 19 are aligned with corresponding openings in inwardly directed attachment tabs 49 (see FIG. 6) on the side rims 45, 46 of the door opening, and suitable fasteners 50 such as plastic pop pin fasteners, nylon push-in rivets, or the like are pushed through the aligned openings to secure the insert 10 in the box. The door 42 of the box has a slot 52 through which the locking tab extends when the door is closed, and a padlock or the like engages the opening 54 in tab 47 to lock the door in the closed position.

A face plate 55 with the desired number of connection jacks or ports 56 is mounted on the base plate 14 of the connector insert 10 extending over aperture 26, as indicated in FIG. 7, after appropriate connection to cables extending into the box 12 through opening 60. Prior to attachment of the face plate, U-style clip on nuts 58 may be clipped over the upper and lower side edges of aperture 26, so as to extend over openings 28, as seen in FIG. 5, and have threaded openings aligned with openings 28. These openings are aligned with corresponding standard fastener openings in the face plate and suitable fasteners 59 such as plastic pop pin fasteners, screws or the like extend through the aligned openings to secure the face plate to the back plate 14 (FIG. 7).

As indicated in FIGS. 5 and 6, an opening 60 provided in the upper wall 62 of box 12 faces the cable management area 64 inside the box which is located between the back plate 14 and the rear wall 65, and is directly above the cable management fingers 34, 35 which provide a winding spool for excess cable in the box. A flanged connector sleeve of a secure conduit system may be secured in the opening 60 to guide cable into the box, as described in more detail below in connection with the embodiment of FIGS. 12 to 16. One such flanged connector sleeve is described in U.S. Pat. Nos. 7,049,517, 7,115,814, and 7,183,488 of McCarthy et al., referenced above, and the entire contents of each of these patents are incorporated herein by reference. Another flanged connector which may be connected through opening 60 is described in co-pending patent application Ser. No. 12/256,709 filed on Oct. 23, 2008 and entitled Flanged Sleeve Connector for Secure Conduit System, the contents of which are incorporated herein by reference. One or more cables which extend through the secure conduit system and permit access to the secure network extend through the sleeve in opening 55 and into the area 64 of the box behind the back plate 14 of device 10, as can be seen in FIG. 6. Each cable is suitably wired to connection jacks or ports 64 in face plate 55 through aperture 26 before the face plate is secured to the back plate 14 in the mounted position seen in FIG. 7. Excess cable can be wound or looped around the indents 36 in cable management fingers 34, 35 for strain relief and to reduce or avoid kinking or tangling of cables. Strain relief is particularly important in the case of fiber optic cables which are subject to signal loss if bent beyond a minimum bend radius. Face plates with a greater or lesser number of connection jacks, and different types of connection jack, may be mounted in the device 10 in alternative embodiments, depending on system requirements.

With this arrangement, all cables are completely hidden behind the back plate device 10, even when door 42 is open, and light emitted from the cables is substantially blocked, producing a more secure assembly which is relatively resistant to unauthorized attempts to capture fiber optic cable signals. At the same time, the back plate device provides both a mounting surface for any standard face plate and a cable management spool assembly for management and strain relief of excess lengths of cable inside the box 12. When assembled as in FIG. 7, the cable ends are concealed and relatively inaccessible and cannot be readily unplugged or cut. It is relatively easy to install the back plate device in the box, and to handle cables for attachment to a suitable face plate through the aperture 26, and subsequently to secure the face plate to the back plate 14. The face plate connector insert 10 is designed as a mount for any industry standard face plate.

Figure 8:
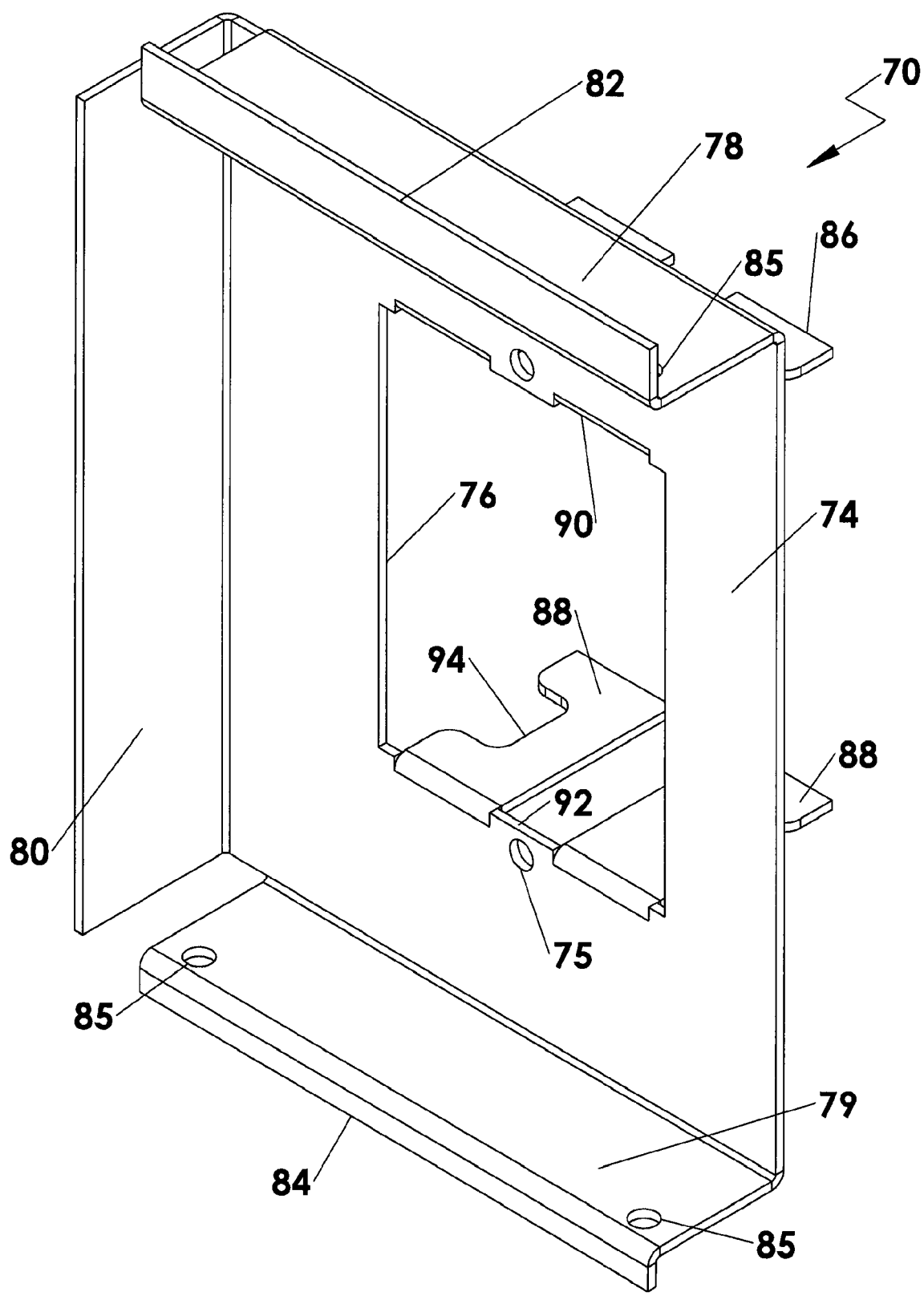
FIG. 8 is a perspective view of retrofit back plate device according to another embodiment.
Figure 9:
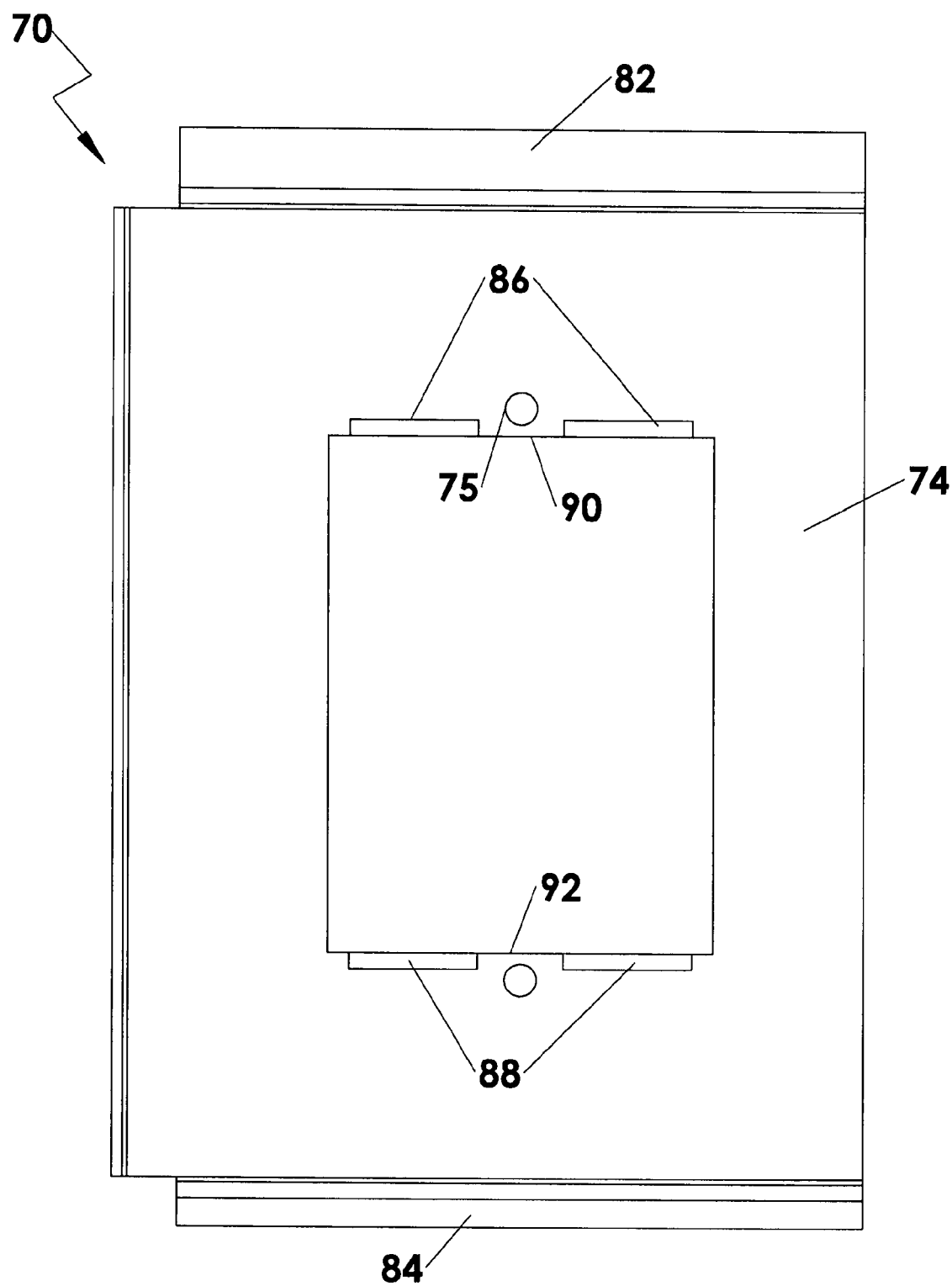
FIG. 9 is a rear elevation view of the device of FIG. 8.
Figure 10:
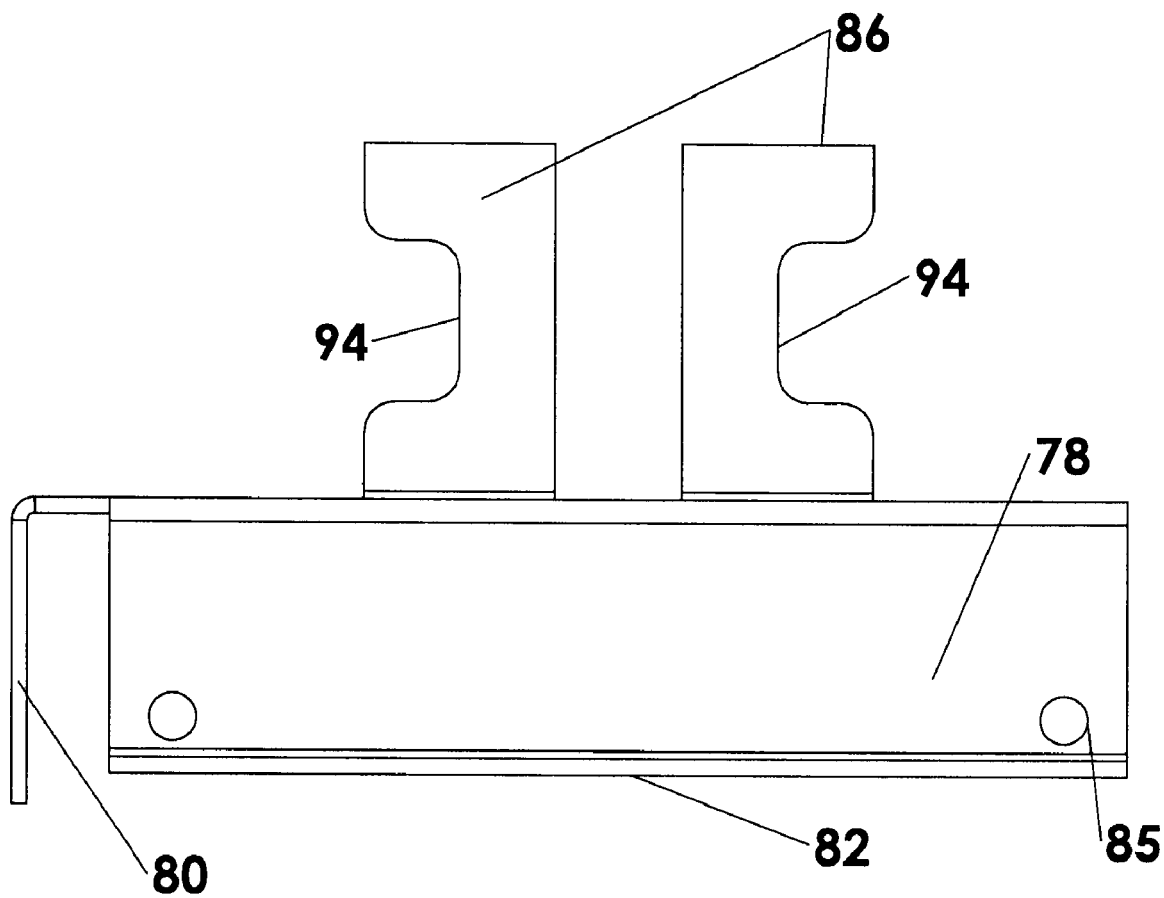
FIG. 10 is a top plan view of the device of FIGS. 8 and 9.
Figure 11:
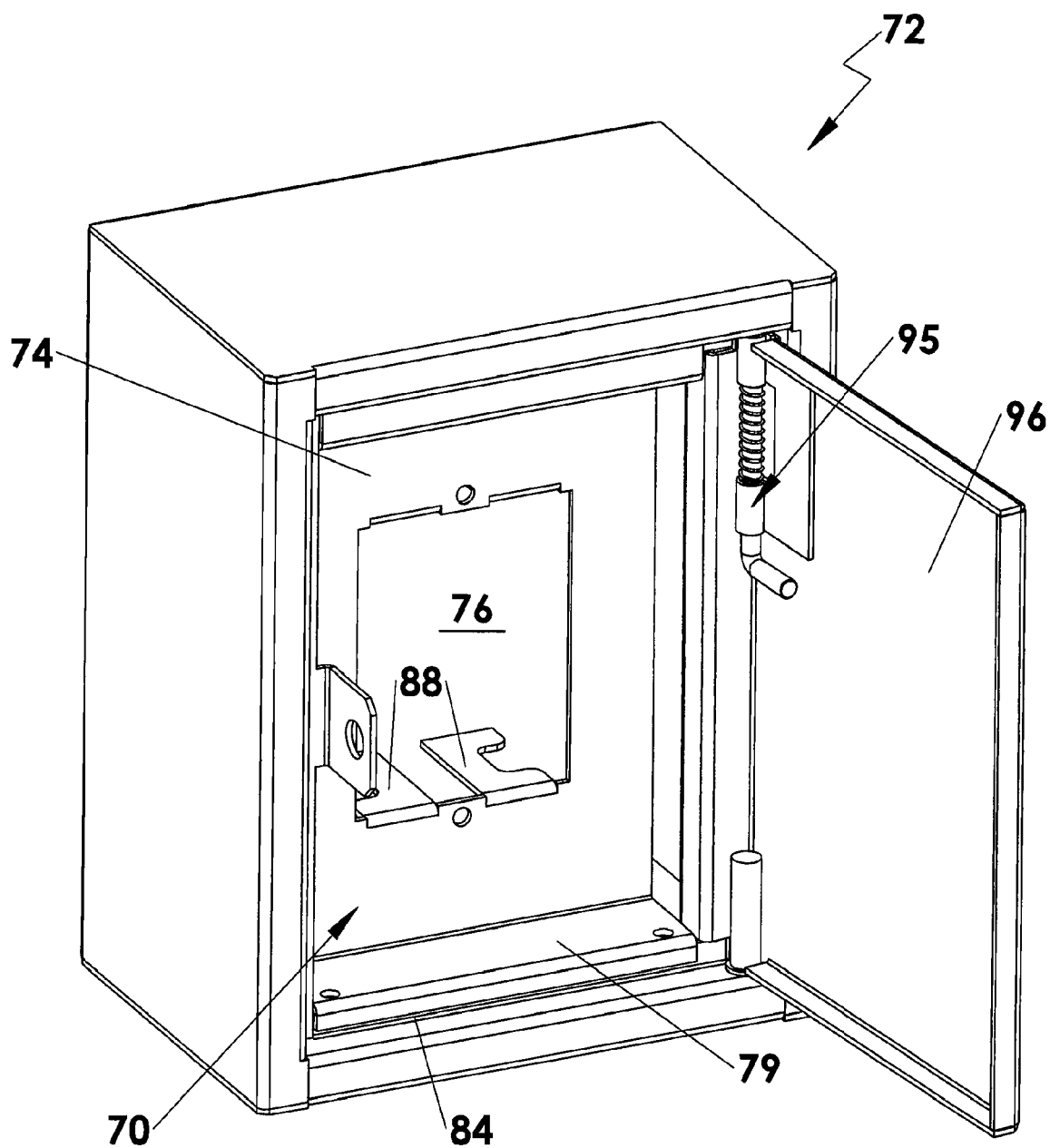
FIG. 11 is a perspective view of a user drop box or control box with the back plate device of FIGS. 8 to 10 seated inside the box.

FIGS. 8 to 10 illustrate a modified back plate device or face plate connector insert 70 which is designed as a retrofit for user control boxes having side opening doors, such as the user control box or secure enclosure 72 illustrated in FIG. 11. Back plate device 70 comprises a frame having a back plate 74 similar to the back plate of the previous embodiment, and is similarly adapted for mounting different types of face plate via fastener openings 75 adjacent upper and lower edges of a cable aperture or cable access opening 76 in the back plate. However, in this embodiment, one of the four sides of the frame is open, and specifically one of the side wall portions of the previous embodiment is omitted altogether, and the device 70 has only an upper wall portion 78, a lower wall portion 79, and a single left hand side wall portion 80, with a completely open right side. This version is designed for a connection or control box having a door which opens to the right. An alternative embodiment may have a single right hand side wall and an open left side for use in a box having a door which opens to the left. The upper and lower wall portions 78, 79 have outwardly projecting rims or flanges 82, 84 designed for engagement over corresponding upper and lower portions of a recessed front rim or shoulder of the box or enclosure 72, as indicated in FIG. 11. The upper and lower wall portions each have a pair of spaced fastener openings 85 adjacent the rim 82, 84, respectively, and these are aligned with corresponding openings provided in the box when positioned as in FIG. 11, to receive suitable fasteners in the same manner as described above in connection with the first embodiment. The side wall portion 80 is not fastened to the box and acts mainly as a guide and as a light shield for fiber optic cables located in the box behind the back plate or face plate mounting plate 74.

As in the first embodiment, first and second pairs of cable management fingers or tabs 86, 88 project rearward from the rear face of back plate 74 adjacent the upper end lower edges 90, 92, respectively, of aperture 76, as seen in FIGS. 8 to 11. These have indents 94 as in the previous embodiment which can be used for winding excess cable after wiring to the face plate, as described above. The indents may be of any shape such as rounded, rectangular, or the like.

The retrofit back plate device 70 of FIGS. 8 to 10 is of suitable dimensions for seating a face plate against back plate 74 in a similar manner to that described above in connection with the first embodiment, and for seating against an interior rim or edge of a user control box 72 as indicated in FIG. 11, and dividing the control box between a forward, face plate seating portion and a rear, cable management portion. The open side of the insert is adjacent the hinge mechanism 95 securing door 96 to the box and provides clearance for the door rim as it rotates into a closed position. The insert 70 is secured in position in the control box by suitable fasteners extending through openings 85 and aligned openings in tabs or portions of the interior of the box 72. The control box has an opening (not illustrated) in at least one wall through which cables are guided into the control box behind the back plate device. The cables can be suitably wired to a face plate with excess cable wound around indents 94 before securing the face plate to back plate 74 via openings 75. The control box 72 is similar to that described in U.S. Pat. No. 6,838,616 of Harrison et al., referenced above, the contents of which are incorporated herein by reference. However, similar retrofit back plate devices can be mounted in other control boxes of different shapes and dimensions, with suitable adjustment of the insert dimensions as needed.

Figure 12:
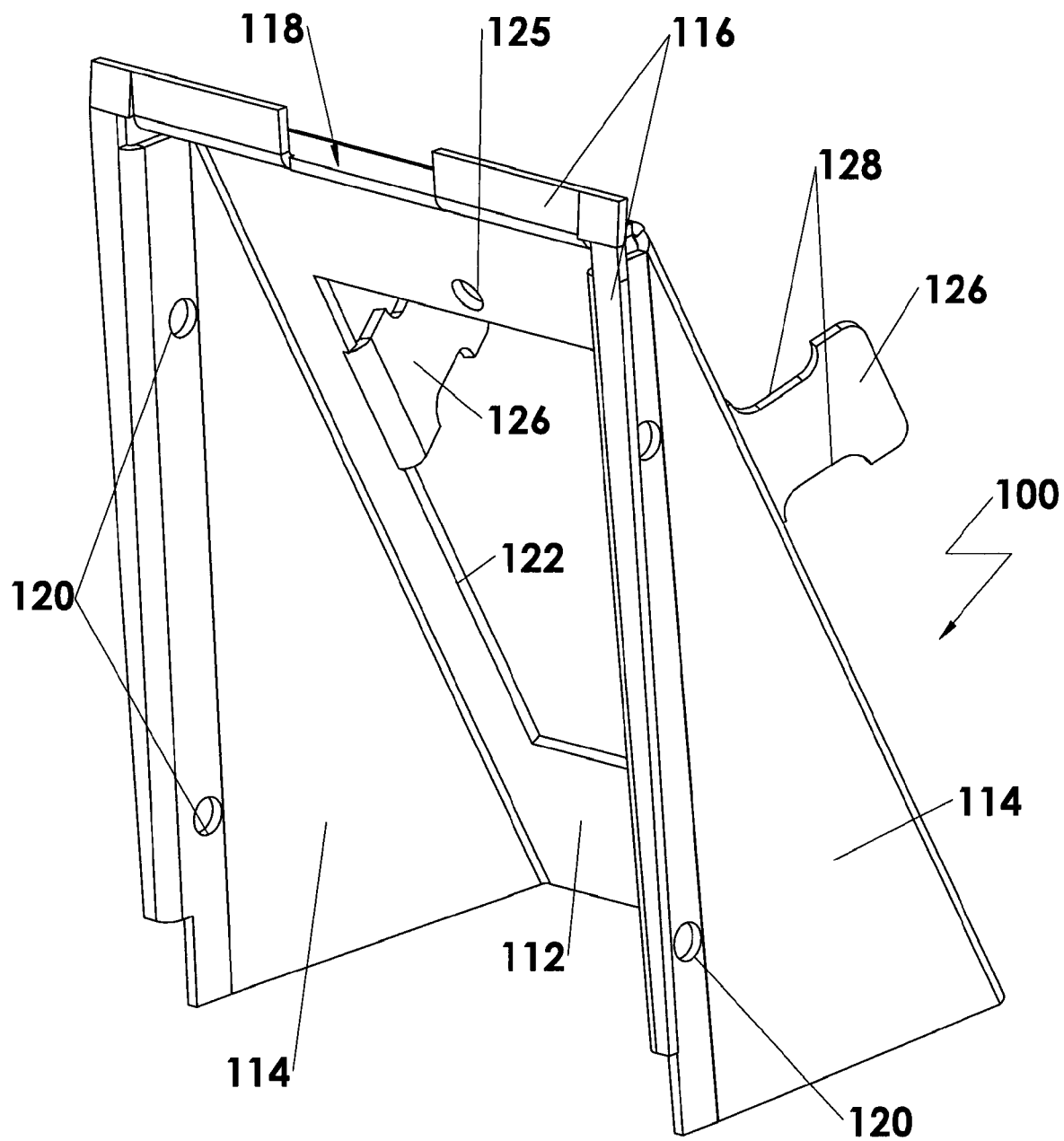
FIG. 12 is a front perspective view of an angled back plate device according to another embodiment.
Figure 13:
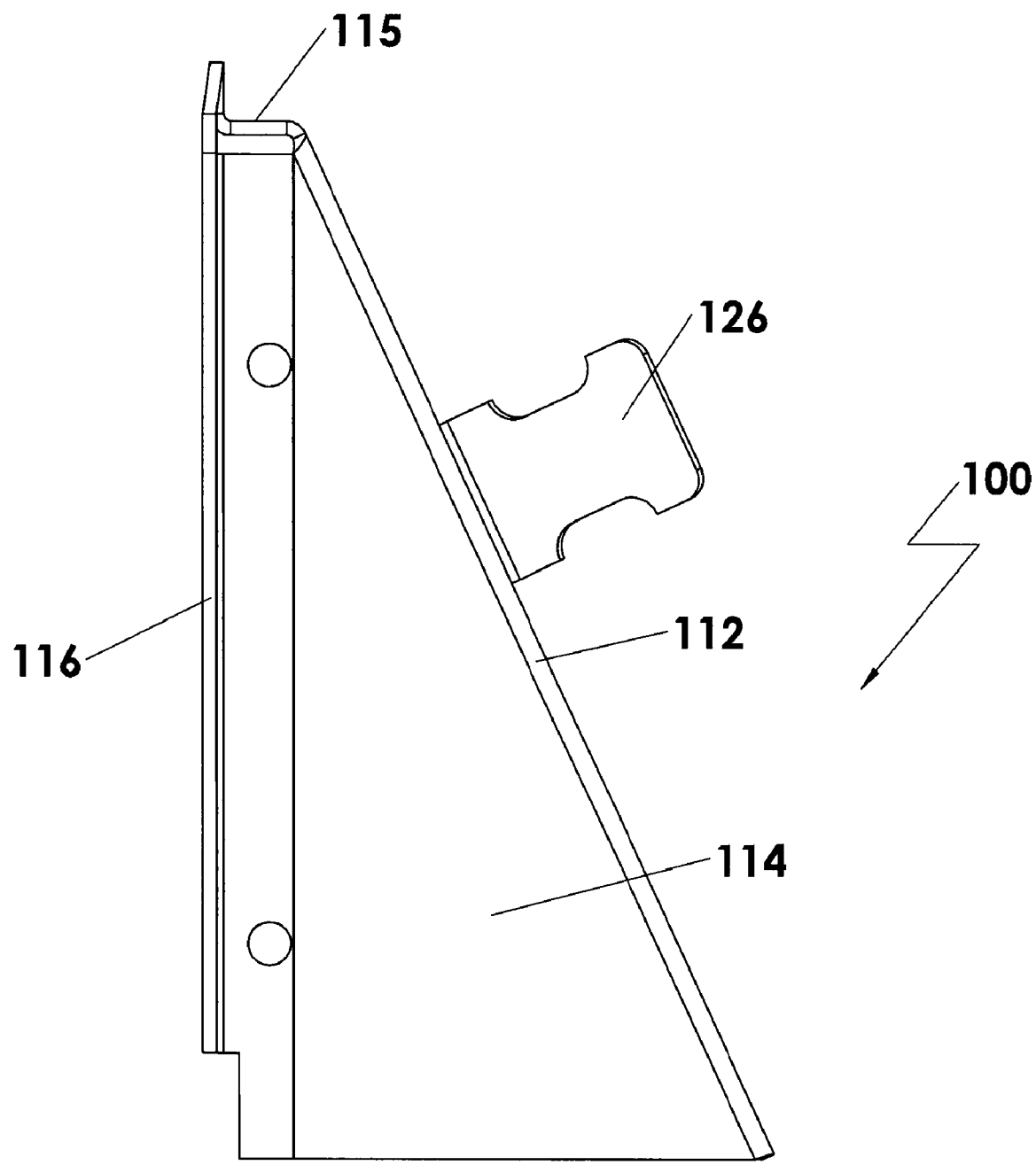
FIG. 13 is a side elevation view of the device of FIG. 12.
Figure 14:
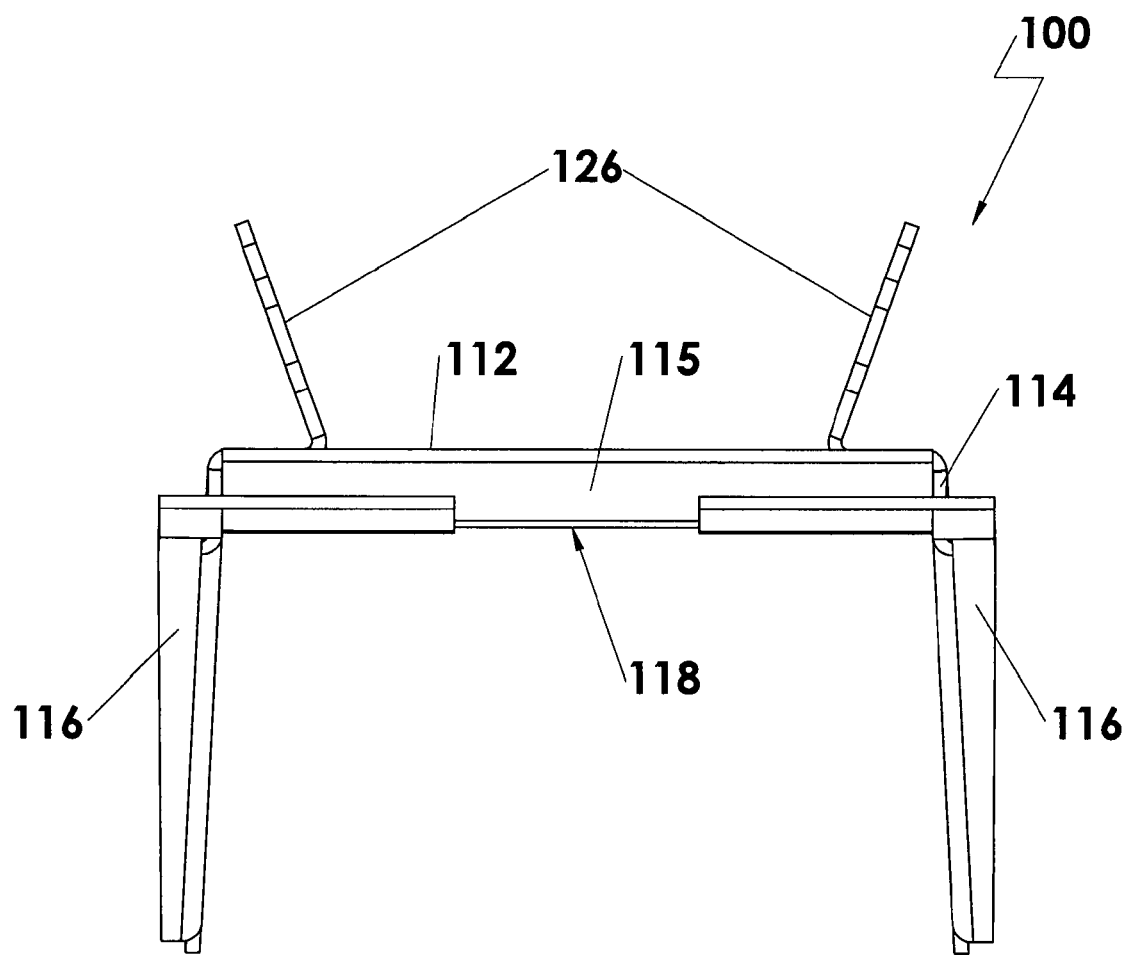
FIG. 14 is a top perspective view of the device of FIGS. 12 and 13.
Figure 15:
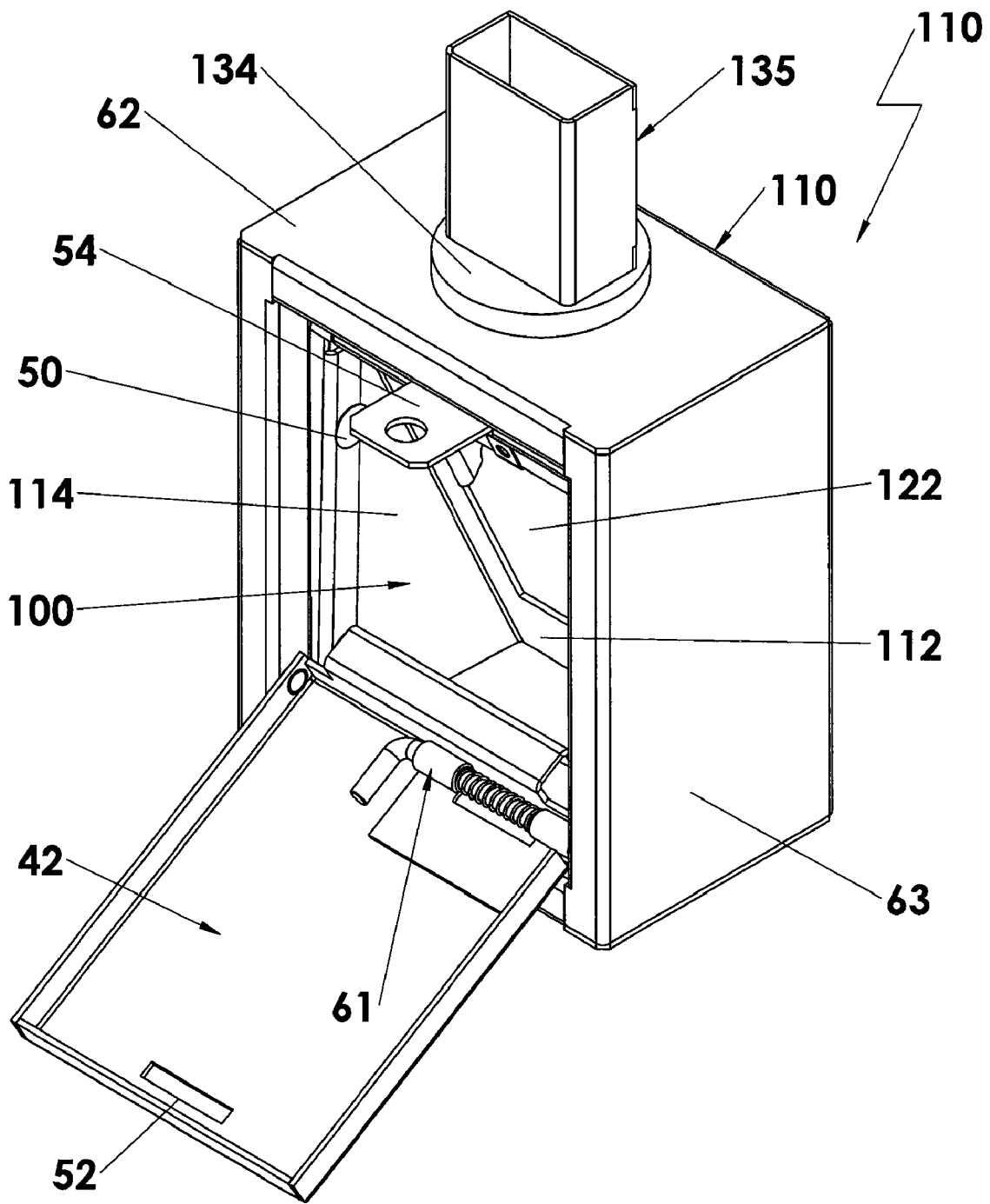
FIG. 15 is a perspective view of the device of FIGS. 12 to 14 installed in an enclosure or network connection box.
Figure 16:
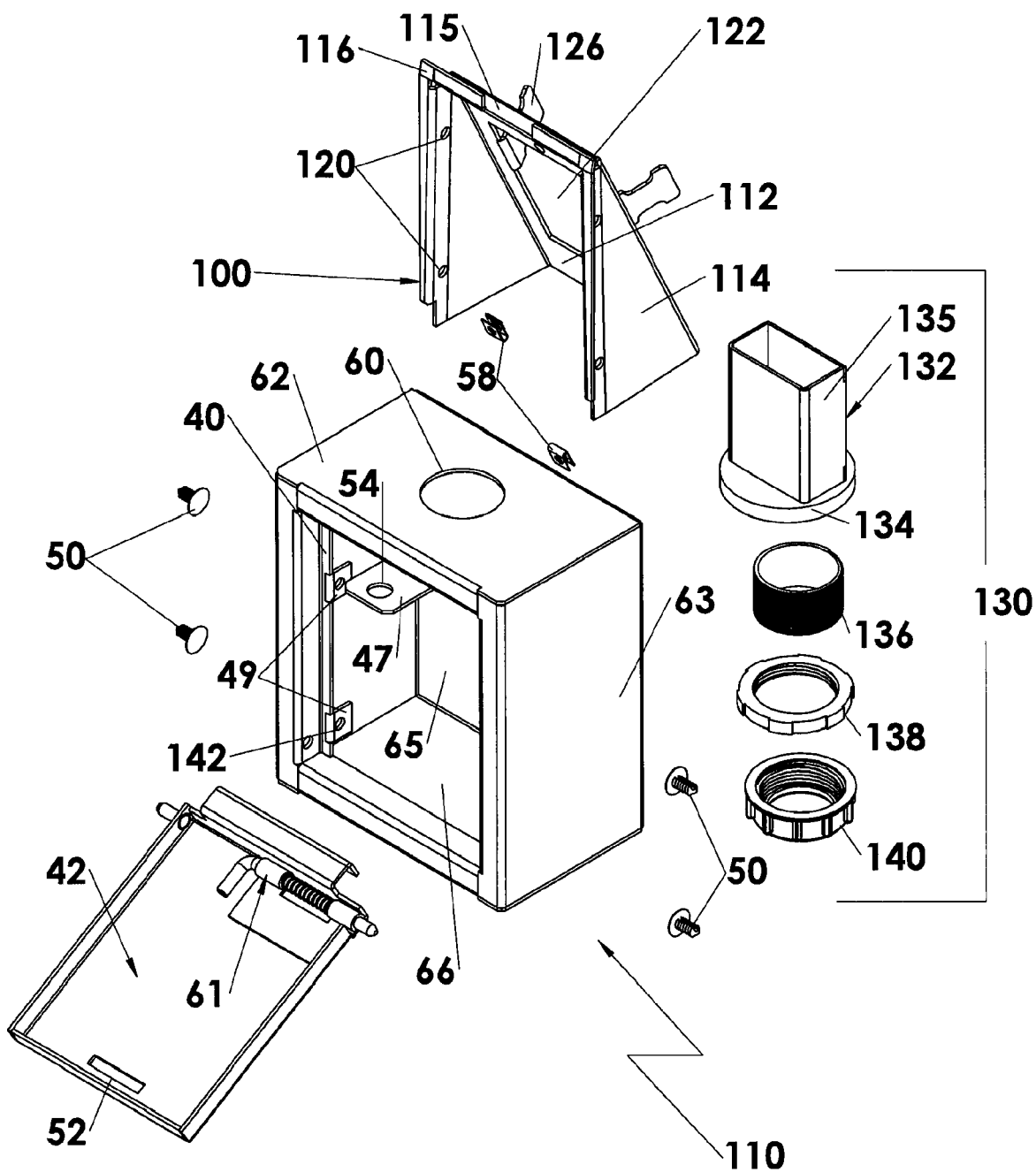
FIG. 16 is an exploded perspective view of the components of FIG. 15.

FIGS. 12 to 14 illustrate a back plate device 100 according to another embodiment which may be used in smaller network connection or control boxes or in order to provide strain relief for cables entering the box. FIG. 15 illustrates the device 100 secured in a control or connection box 110, while FIG. 16 illustrates the exploded, separate components of the box, back plate device, and various connectors, as described in more detail below.

Back plate device 100 comprises a frame having four sides, an open front face and a back plate 112 which is inclined at an angle to the open front face. Two opposite sides of the frame comprise generally triangular shaped side wall portions 114 extending between the opposite sides of the back plate and the open front face of the frame. One of the other sides comprises relatively small upper wall portion 115 while the opposite side, at the lower end of the device 100 as viewed in FIGS. 12 and 13, is open. As illustrated in FIGS. 12 and 13, back plate 112 is angled rearwardly away from the open front face of the box. The frame side at the lower end of the frame is open in this embodiment, although a lower end wall portion may be provided in alternative embodiments, and the frame may have an open side replacing one of the side wall portions 114 if it is to be installed in a box having a side opening door. As in the previous embodiments, the open front face has an outwardly projecting rim or flange 116 designed for seating against a corresponding rim or inset shoulder in a door opening of the box. In this case, the rim 116 has a gap 118 in an upper portion to provide clearance for a lock tab 47, as described below, and extends downwardly along most of the length of the side walls, terminating short of the lower end of the frame to provide clearance for the drop down door of the box when installed. Also as in the previous embodiments, fastener openings 120 are provided in the side wall portions of the frame.

The back plate 112 of this embodiment is similar in design to the previous embodiments apart from the angle relative to the open front face of the frame, and has a cable aperture or cable access opening 122 surrounded by a peripheral ledge or rim against which a face plate can be seated. The angle of the back plate allows aperture 122 to be the same size as in the previous embodiments, while the overall size of the frame is smaller so as to fit in a smaller network connection box.

Fastener openings 125 are provided in the plate adjacent the upper end lower edge of aperture 122. A pair of angled tabs or cable management fingers 126 extend rearward from the rear face of the back plate, and are used to provide a cable management spool in a similar manner to the previous embodiments. Unlike the previous embodiments, there are only two tabs or fingers in this embodiment, and they are oriented differently from the previous embodiments. In this embodiment, the tabs 126 are inclined outwardly away from one another, as seen in FIG. 14, and are located on the side edges of aperture 122, rather than on the upper and lower edges as in the previous embodiments. Tabs 126 as in this embodiment may also be used in place of the tabs or cable management fingers of the previous embodiments. The tabs or fingers 126 have arcuate indents 128 in their opposite side edges for cable wrapping purposes.

The back plate device 100 of this embodiment is installed in a network connection box or control box 110 in a similar manner to that described above in connection with the previous embodiment. Box 110 is similar to the connection box 12 of the first embodiment, although it may be of different dimensions, and like reference numbers have been used for like parts as appropriate. As in the previous embodiment, and as illustrated in FIGS. 15 and 16, the box 110 has a front wall opening in which a drop down door 42 is pivoted via pivot mechanism 61, a recessed rim or shoulder 40, and inwardly directed fastener tabs 49 positioned for alignment with the openings 120 adjacent the front edges of the side wall portions 114 of the back plate device. A cable entry opening 60 is provided in an upper wall of the box (and may alternatively be provided in any of the other walls 63, 65 or 66 of the box according to installation requirements). FIG. 16 illustrates a flanged sleeve connector 130 which may be secured in opening 60 in one embodiment in order to guide cables from a conduit system into the box, as described, for example, in co-pending U.S. patent application Ser. No. 12/256,709 referenced above. The dimensions of the connector 130 are dependent on the size of the conduit required for the particular installation. Connector 130 comprises a flanged sleeve 132 having a round flange 134 at one end for seating on wall 62 over opening 60 and a rectangular tube section 135 extending from flange 134, a threaded nipple 136 for threaded engagement in an internally threaded portion of the sleeve 132 which extends from the flanged end of the sleeve, a pipe lock nut 138 for engaging over the end of nipple 136 inside the box to secure the sleeve to the box, and a pipe bushing 140 which engages over the exposed end of nipple 136 after the nut is secured in place.

In order to install the back plate device 100 in the box 110, the device is inserted through the front opening until the flange 116 seats against shoulder or rim 40, and the push in rivets 50 are engaged in the aligned holes 120, 142 in the side wall portions of device 100 and in the tabs 49, respectively. The inclined back plate 112 is inclined rearwardly towards the rear wall 65 of the box and is positioned so that the aperture 122 is located below, and faces, the cable entry opening.

The angle is designed into the back plate to allow for use in smaller dimension enclosures, while maintaining the requirement for the same center cutout dimension necessary for a cable pass through behind a mounted commercial faceplate. Additionally, the angle allows for a less than 90 degree connection on the back of the commercial faceplate, which aids in terminating the connection when using fiber optic (FO) cable and/or copper cable by reducing strain on the cable and cable connectors. The angle of the back plate is not exclusive to FIG. 12, but could be increased or decreased based on the size of the enclosure it is being fitted into, and the cable strain relief on the backside when terminated with FO cable. The back plate angle may be between 0 and 90 degrees to the front face opening of the frame or back plate device (0 degree corresponds to FIGS. 1 to 11), and in some embodiments the range of angles is from around 15 degrees to 85 degrees. In the illustrated embodiment, the back plate angle to the front face of the frame (FIG. 13) is of the order of 25 degrees. Also, the back plate is slanted in a direction such that the rear face of the plate faces towards the wall of the box having the cable opening. In FIGS. 15 and 16, cables enter through the upper wall, but they may alternatively enter through the bottom wall, side walls, or back wall. Thus, if the opening 60 is made in the bottom wall, the back plate angle is reversed so that it is inclined rearward from the lower end to the upper end of the frame, i.e. the reverse of FIGS. 12 to 16. For a side wall opening, it is angle rearward from the side with the opening to the opposite side.

The angled tabs 126 on the back of the back plate device allow for a cable loop wrap per industry standard practices, further reducing cable and connector strain if the faceplate were removed and pulled away with from the back plate with the connectors/cable still attached resulting in tension (possible breakage) of the cable.

The back plate devices or face plate connector inserts described above may be provided in different sizes and shapes to fit any standard secure network control box or user accessible enclosure. The outwardly projecting rims on two or more peripheral wall portions surrounding the recessed face plate mounting surface are designed to engage corresponding internal rims or shoulders inside the box, and the overall structure hides all cables behind the wall plate and also helps to block light signals emitted from fiber optic cables, for added security even when the front door of the box is open. The recessed back plate of the device acts as a mount for any industry standard face plate, and the cable management fingers projecting from the rear face of the back plate into the cable containing portion of the box act as a winding spool for cable management purposes. Excess cable can be wound on the spool in order to reduce strain and excess bending of cables, which is particularly important in order to reduce signal loss in fiber optic cables.

Any of the back plate devices described above may be provided in different colors which conform to a network standard indicating the type of network, such as unclassified or non-secure, secure, and the like. Typically, such networks have cables and other components of a selected color, but the cables are connected to standard, white texture face plates. This can make it difficult for users to determine whether or not they should connect their computer to a network accessed via a control box, particularly in installations which include different secure and non-secure networks. The back plate devices described above may be manufactured in various different color finishes over part or all of their surfaces, in colors matching the different types of network. Back plate devices of a particular secure network color may be installed in all the control boxes for a secure network, while back plate devices of a different color corresponding to a non-secure network are installed in all the control boxes for the non-secure network. A user opening a box can then immediately determine whether the color of the back plate device visible around the periphery of the face plate matches the color of the connection cables or patch cords on their device. This may help to avoid the problems occurring when a user with a non-secure device accidentally connects to a secure network.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A back plate device for mounting a face plate in a network connection box, comprising:

a generally rectangular frame having an open front face and four sides, a back plate which is recessed inwardly from the open front face, at least one of the sides comprising a first wall portion extending from the back plate to the open front;

the back plate having a front face, a rear face, and a cable access opening, and the front face of the back plate which surrounds the cable access opening defining a ledge against which a face plate can be seated; and the frame having outer dimensions less than dimensions of a network connection box in which it is to be installed, whereby the back plate is spaced from a rear wall of the box when installed to define a concealed cable management area behind the back plate where cables are secured to the face plate through the cable access opening.

2. The back plate device of claim 1, further comprising an outwardly projecting flange which extends transversely outwardly from the open front face and seats against a corresponding shoulder in an access opening to said network connection box when the frame is installed in the box.

3. The back plate device of claim 2, wherein the front face of the frame has a rectangular outer periphery and the flange extends along at least a major part of the outer periphery of the front face.

4. The back plate device of claim 1, wherein at least two of the sides of the rectangular frame comprise wall portions extending from the back plate to the open front face of the frame.

5. The back plate device of claim 4, wherein one of the sides of the frame comprises an open face.

6. The back plate device of claim 4, wherein the four sides of the frame all comprises wall portions extending between the back plate and the open front face of the frame.

7. The back plate device of claim 1, wherein the ledge has fastener openings aligned with corresponding fastener openings in the face plate seated on the ledge and extending over the cable access opening.

8. The back plate device of claim 1, wherein the back plate has at least two cable management fingers projecting outwardly from the rear face of the back plate, the fingers comprising a cable management spool which manages excess lengths of a cable inside the network connection box when the frame is secured in the box.

9. The back plate device of claim 2, wherein the back plate has opposite first and second ends, and opposite sides, the first wall portion of the frame comprises a first end wall portion extending from the first end of the back plate to the front face and one of the sides of the frame adjacent to the first end wall portion comprises a first side wall portion extending from one of said opposite sides of the back plate to the front face, and at least one outwardly projecting flange extends along at least part of the length of each of said wall portions at the open front face.

10. The back plate device of claim 9, wherein two opposite sides of the frame comprise side wall portions each having an outwardly projecting flange extending along at least a major portion of its length at the open front face.

11. The back plate device of claim 10, wherein both said side wall portions have at least two spaced fastener openings which are aligned with corresponding openings in the network connection box when the frame is installed in the box.

12. The back plate device of claim 10, wherein the side of the frame between the second end of the back plate and the front face is open.

13. The back plate device of claim 9, wherein the outwardly projecting flange on the first end wall portion has a central slot.

14. The back plate device of claim 9, wherein the side of the frame opposite to the first end wall portion comprises a second end wall portion extending from the second end of the back plate to the front face and the side of the frame opposite to the first side wall portion is open.

15. The back plate device of claim 14, wherein each of said end wall portions has at least two spaced fastener openings which are aligned with corresponding openings in the network connection box when the frame is installed in the box.

16. The back plate device of claim 1, wherein the back plate is parallel to the open front face of the frame.

17. The back plate device of claim 1, wherein the back plate is inclined at an angle to the open front face of the frame.

18. The back plate device of claim 17, wherein the open front face of the frame has an upper end and a lower end and the back plate is inclined rearwardly away from the front face from the upper end to the lower end of the front face.

19. The back plate device of claim 17, wherein the back plate is inclined at an angle no greater than 90 degrees.

20. The back plate device of claim 19, wherein the angle is in the range from 15 to 75 degrees.

21. A network connection box, comprising:

a housing having a back wall, opposite side walls, a first end wall, a second end wall, and a front wall having an access opening, the walls surrounding an interior space in said housing;

a door hinged to the front wall for movement between a closed position covering the access opening and an open position allowing access to the interior space;

a back plate device secured in the housing, the back plate device comprising a generally rectangular frame which at least substantially fills the access opening into the interior space, the frame having an open front face and a back plate recessed inwardly from the front face and the access opening and spaced from the back wall of the housing to define a cable management area between the back plate and the back wall; and the back plate having a front face, a rear face, and an opening, and defining a ledge surrounding the opening against which a face plate can be seated to extend across the opening for connection to cables in the cable management area.

22. The box of claim 21, wherein the back plate has a plurality of cable management fingers projecting outwardly from the rear face of the back plate into the cable management area, the fingers comprising a cable management spool which manages excess lengths of cables in the cable management area when ends of the cables are connected to the face plate secured across the opening in the back plate.

23. The box of claim 21, wherein the housing has a cable entry opening in one of its walls which communicates with the cable management area behind the face plate.

24. The box of claim 21, wherein the back plate extends parallel to the open front face of the frame.

25. The box of claim 21, wherein the back plate extends at an angle to the open front face of the frame.

26. The box of claim 25, wherein the back plate is inclined inwardly towards the rear wall of the housing in a direction between the first and second end walls of the housing, and the first end wall of the housing has a cable entry opening which faces the rear face of the inclined back plate.

27. The box of claim 26, wherein the frame has at least two opposite wall portions extending from the back plate to the open front face of the frame, each of said wall portions having at least a first fastener opening, and the housing has at least two corresponding second fastener openings aligned with the respective first fastener openings in the opposite wall portions, and a fastener device extends through each of the aligned first and second fastener openings.

28. The box of claim 21, further comprising at least one fastener securing the back plate device in the housing.

29. The box of claim 21, further comprising a hinge mechanism in the box which hinges the door to a first side of the access opening, one of said sides of the frame opposite to the first side of the access opening comprising a side wall portion extending from the back plate to the open front face of the frame, the side of the frame at the first side of the access opening being open.

30. The box of claim 21, further comprising a hinge mechanism in the box which hinges the door to one end of the access opening, the frame having at least a first end wall portion opposite to said hinge mechanism and opposite side wall portions adjacent said first end wall portion, said end wall portion and said opposite side wall portions extending between the back plate and said open front face of the frame.

31. The box of claim 30, wherein the frame has an open second end opposite said first end wall portion extending over the hinge mechanism.

32. The box of claim 30, wherein the frame has a second end wall portion opposite said first end wall portion, the second end wall portion having a forward edge spaced above the hinge mechanism.

33. The box of claim 21, wherein the frame has an outwardly extending flange extending transversely outwardly around at least part of the open front face and engaging an opposing surface of the housing.

34. The box of claim 33, wherein the housing has a front peripheral rim around the access opening and a locking tab projecting forward from the front rim and the outwardly extending flange of the frame is seated against the front peripheral rim, the door having a slot through which the locking tab projects in the closed position, and the outwardly extending flange of the frame has a clearance opening engaged over the locking tab.

35. The box of claim 34, wherein the outwardly extending flange has a slot engaged over the locking tab.

36. The box of claim 34, wherein the outwardly extending flange has a gap through which the locking tab extends.

37. The box of claim 21, wherein at least the front face of the back plate is of a predetermined color which is coordinated with a color code for a network to which the box is to be connected.

38. A back plate system for mounting face plates in network connection boxes of different types of networks, comprising:
   a plurality of back plate devices, each comprising:
      a generally rectangular frame of outer dimensions less than the dimensions of a network connection box in which it is to be installed, the frame having four sides, an open front face and a back plate which is recessed inwardly from the open front face, the back plate having a front face and a rear face; and
   the back plate having a cable access opening, and defining a ledge surrounding the cable access opening against which a face plate can be seated;
   each of said frames being of a predetermined color on at least a portion of a surface of the frame which is exposed when the frame is installed in the box; and
the frames having different predetermined colors matching a series of different network color codes, including color codes for secure and non-secure networks.

\* \* \* \* \*